April 13, 1926.

D. GRILL

STORAGE BATTERY

Filed Feb. 14, 1925

1,580,596

Inventor
Daniel Grill

By Watson E. Coleman
Attorney

Patented Apr. 13, 1926.

1,580,596

UNITED STATES PATENT OFFICE.

DANIEL GRILL, OF ROANOKE, VIRGINIA.

STORAGE BATTERY.

Application filed February 14, 1925. Serial No. 9,132.

*To all whom it may concern:*

Be it known that I, DANIEL GRILL, a citizen of the United States, residing at Roanoke, in the county of Roanoke and State of Virginia, have invented certain new and useful Improvements in Storage Batteries, of which the following is a specification, reference being had to the accompanying drawings.

This invention relates to storage batteries and more particularly to the manner of mounting the plate groups upon the cover and the links upon the posts of such plate groups.

An important object of the invention is to provide a device of this character affording a tight mechanical seal, thus eliminating the use of sealing compounds with the battery.

A further object of the invention is to provide a device of this character in which means are provided for sealing the post to the cover against the escape of gases or liquids about the sides of the post and additional means for securing the link in position which seals against escape of gases passing upwardly about the threads of the post.

These and other objects I attain by the construction shown in the accompanying drawings, wherein for the purpose of illustration is shown a preferred embodiment of my invention and wherein:—

Figure 1:
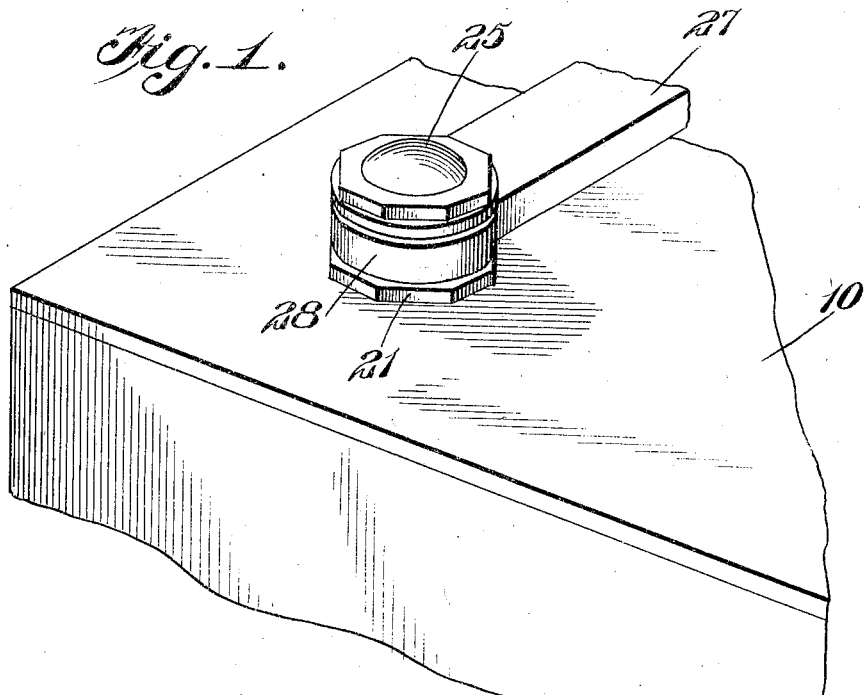
Figure 2:
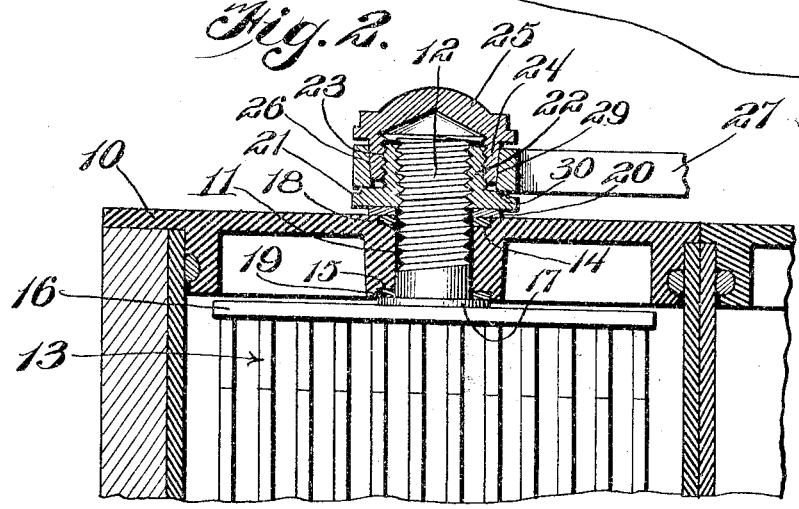

Figure 1 is a perspective view showing a storage battery embodying cell unit and link mounting constructed in accordance with my invention; and Figure 2 is a vertical sectional view therethrough.

Referring now more particularly to the drawings, the numeral 10 generally designates a jar cover of a storage battery, 11 the opening therethrough for the passage of the post 12 of a plate group generally designated at 13. In accordance with my invention, the battery cover about the sides of the opening 11 thereof is preferably recessed on its upper and lower faces, as indicated at 14 and 15 respectively, for a purpose presently to appear. Furthermore, the post is threaded for substantially its entire length and the strap 16 of the plate group has formed thereon about the post a shoulder 17.

Between this shoulder 17 and the cover and seating within the recess 15 is disposed a rubber washer 18 and within the recess 14 of the upper surface of the cover a second similar washer 19 is arranged about the post. Upon the upper surface of this washer 19 a metallic washer 20 is preferably seated. A nut 21 is provided having at one side thereof an axial boss 22. The boss and nut are interiorly threaded for engagement with the post and the exterior of the boss, which is upwardly projecting, is threaded for the reception of interior threads 23 formed upon the depending flange 24 of a cap 25. The cap and nut are each provided upon their outer faces with wrench squares. The exterior face 26 of the flange 24 of the cap is tapered downwardly. The numeral 27 designates a link which may be of the usual construction with the exception of the fact that the eye 28 thereof has its bore 29 tapering downwardly for coaction with the tapered outer face 26 of the flange 24. The nut 21 is preferably provided upon its upper face about the boss with an upstanding shoulder 30 of greater diameter than the lower smaller end of the bore as shown.

In the application of the plate to the cover, the washer 18 is first placed in position and the post applied through the cover. The washer 19 is then placed in position, then the washer 20 and the nut 21 is applied with its boss facing upwardly. This nut is tightened down until the washers are fully compressed and a seal is afforded between coacting faces of the strap and cover and of the washer 21 and cover. The link is then applied with the smaller end of its bore facing downwardly and after this the cap 25. This cap is screwed down by means of a wrench so that its tapered outer face firmly seats in the tapered bore of the link and the link is forced downwardly to solidly engage against the shoulder 30 of the nut. These links being of soft material, will provide a tight seal both against the outer surface of the flange and the shoulder of the nut and thus a seal is provided preventing escape of any gases which may pass upwardly about the threads of the post 20. It will be obvious that the washer 20 might be eliminated and the lower face of the nut brought directly into engagement with the rubber washer 19 but the construction shown is preferred for the reason that the rotation of the nut would tend to grasp against and possibly tear this rubber washer.

It will furthermore be obvious that the construction herein shown and described is capable of a certain range of change and modification without in any manner departing from the spirit of my invention and I accordingly do not limit myself to such specific structure except as hereinafter claimed.

I claim:—

1. Means for mounting storage battery plate units and the links thereof upon the covers of the cells comprising the combination with a cover having an opening therethrough, of a battery plate unit including a strap and post, the post being directed through the opening, a compressible packing element disposed between the strap and the opposed face of the cover, means mounted upon the post and engaging the opposite face of the cover for drawing the post through the cover, a second compressible packing element disposed between said means and the upper face of the battery cover, a link seating upon said means and a cap for maintaining the link in position having sealing engagement with the link and forcing the link into sealing engagement with said means, the cap having a depending flange entering an eye formed in the link, the eye of the link and the flange having coacting tapered faces, the cap having threaded engagement with said means.

2. Means for mounting storage battery plate units and the links thereof upon the covers of the cells comprising the combination with a cover having an opening therethrough, of a battery plate unit including a strap and post, the post being directed through the opening, a compressible packing element disposed between the strap and the opposed face of the cover, means mounted upon the post and engaging the opposite face of the cover for drawing the post through the cover, a second compressible packing element disposed between said means and the upper face of the battery cover, a link seating upon said means, and a cap for maintaining the link in position having sealing engagement with the link and forcing the link into sealing engagement with said means, the cap having a depending flange entering an eye formed in the link, the eye of the link and the flange having coacting tapered faces, said means including a boss surrounding the post and having threaded engagement with the post, the exterior of said boss being threaded, the flange of the cap having threads coacting with the threads of the boss.

3. Means for mounting storage battery plate units and the links thereof upon the covers of the cells comprising the combination with a cover having an opening therethrough, of a battery plate unit including a strap and post, the post being directed through the opening, a compressible packing element disposed between the strap and the opposed face of the cover, means mounted upon the post and engaging the opposite face of the cover for drawing the post through the cover, a second compressible packing element disposed between said means and the upper face of the battery cover, a link seating upon said means, and a cap for maintaining the link in position having sealing engagement with the link and forcing the link into sealing engagement with said means, the cap having a depending flange entering an eye formed in the link, the eye of the link and the flange having coacting tapered faces, said means including a boss surrounding the post and having threaded engagement with the post, the exterior of said boss being threaded, the flange of the cap having threads coacting with the threads of the boss, the flange of the boss being of less length than the thickness of the eye of the link whereby said cap may be forced into engagement with the eye of the link and the link thereby forced into engagement with said means.

In testimony whereof I hereunto affix my signature.

DANIEL GRILL.